(12) United States Patent
Hair et al.

(10) Patent No.: US 12,155,329 B2
(45) Date of Patent: Nov. 26, 2024

(54) HYBRID OR ELECTRIC VEHICLE TRANSMISSION LUBRICATION ARRANGEMENT

(71) Applicant: FORD GLOBAL TECHNOLOGIES, LLC, Dearborn, MI (US)

(72) Inventors: Jonathan Hair, Royal Oak, MI (US); Matthew Penne, Hadar, NE (US); Mohammad Sameer Khan, Windsor (CA); Brendan F. Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 485 days.

(21) Appl. No.: 17/527,407

(22) Filed: Nov. 16, 2021

(65) Prior Publication Data

US 2023/0151884 A1 May 18, 2023

(51) Int. Cl.
| | |
|---|---|
| *B60K 6/26* | (2007.10) |
| *B60K 6/28* | (2007.10) |
| *B60K 6/365* | (2007.10) |
| *B60L 15/00* | (2006.01) |
| *B60L 15/02* | (2006.01) |
| *H02P 27/06* | (2006.01) |
| *F16H 57/04* | (2010.01) |

(52) U.S. Cl.
CPC ............... *H02P 27/06* (2013.01); *B60K 6/26* (2013.01); *B60K 6/28* (2013.01); *B60K 6/365* (2013.01); *B60L 15/007* (2013.01); *B60L 15/02* (2013.01); *F16H 57/0434* (2013.01); *F16N 2230/02* (2013.01); *F16N 2270/72* (2013.01); *H02P 2201/11* (2013.01)

(58) Field of Classification Search
CPC ........ B60K 6/26; H02P 27/06; H02P 2201/11; F16N 2270/72; F16N 2230/02; F16H 57/0434; B60L 15/007; B60L 15/02
See application file for complete search history.

(56) References Cited

U.S. PATENT DOCUMENTS

| | | | | |
|---|---|---|---|---|
| 5,115,887 A | * | 5/1992 | Smith | ................. F16H 57/0447 184/6.12 |
| 2021/0017903 A1 | * | 1/2021 | Thomas | .................. F02B 67/08 |

FOREIGN PATENT DOCUMENTS

| | | |
|---|---|---|
| DE | 102015014890 A1 | 7/2016 |
| JP | 2012235591 A | 11/2012 |

\* cited by examiner

*Primary Examiner* — Jason D Shanske
*Assistant Examiner* — James J Triggs
(74) *Attorney, Agent, or Firm* — David B Kelley; Brooks Kushman P.C.

(57) ABSTRACT

A vehicle includes an inverter, a pump, a buck converter, and a controller. The inverter has an input connected to a battery and an output connected to an electric machine. The inverter is configured to convert power between DC electrical power at the input and AC electrical power at the output. The pump is configured to circulate lubricating fluid within a transmission. The buck converter is configured to deliver DC electrical power from the inverter to the pump. The controller is programmed to, in response to the electric machine delivering AC electrical power to the inverter during a towing condition of the vehicle while the vehicle is shutdown, operate the buck converter to power the pump.

20 Claims, 3 Drawing Sheets

US 12,155,329 B2

HYBRID OR ELECTRIC VEHICLE TRANSMISSION LUBRICATION ARRANGEMENT

TECHNICAL FIELD

The present disclosure relates to hybrid and electric vehicles.

BACKGROUND

Electric and hybrid vehicles may include power supply devices that are configured to convert electrical power from direct current (DC) into alternating current (AC) and vice versa.

SUMMARY

A vehicle includes a drive wheel, an electric machine, a battery, an inverter, a transmission, a pump, a voltage controller, and a controller. The electric machine is configured to deliver and receive mechanical power to and from the drive wheel. The inverter has an input connected to the battery and an output connected to the electric machine. The inverter is configured to convert power between DC electrical power at the input and AC electrical power at the output. The transmission disposed between the electric machine and the drive wheel. The pump is configured to circulate lubricating fluid within the transmission. The voltage controller is configured to deliver DC electrical power from the inverter to the pump. The controller is programmed to, in response to the drive wheel powering the electric machine to generate AC electrical power and the electric machine delivering AC electrical power to the inverter during a towing condition of the vehicle, operate the voltage controller to power the pump.

A vehicle includes at least one drive wheel, an electric machine, a traction battery, an inverter, a transmission, an electrically powered pump, and a step-down voltage controller. The electric machine is configured to deliver power to the at least one drive wheel to propel the vehicle. The traction battery is configured to store electrical energy. The inverter has an input and an output. The inverter is configured to receive DC electrical power from the battery at the input, convert the DC electrical power into to AC electrical power, and deliver the AC electrical power to the electric machine at the output. The transmission is disposed between the electric machine and the at least one drive wheel. The electrically powered pump is configured to deliver fluid to lubrication points within the transmission. The step-down voltage controller is configured to deliver the DC electrical power from the input of the inverter to the electrically powered pump in response to the at least one drive wheel powering the electric machine during a towing condition of the vehicle and the electric machine generating and delivering AC electrical power to the inverter.

A vehicle includes an inverter, a pump, a buck converter, and a controller. The inverter has an input connected to a battery and an output connected to an electric machine. The inverter is configured to convert power between DC electrical power at the input and AC electrical power at the output. The pump is configured to circulate lubricating fluid within a transmission. The buck converter is configured to deliver DC electrical power from the inverter to the pump. The controller is programmed to, in response to the electric machine delivering AC electrical power to the inverter during a towing condition of the vehicle while the vehicle is shutdown, operate the buck converter to power the pump.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
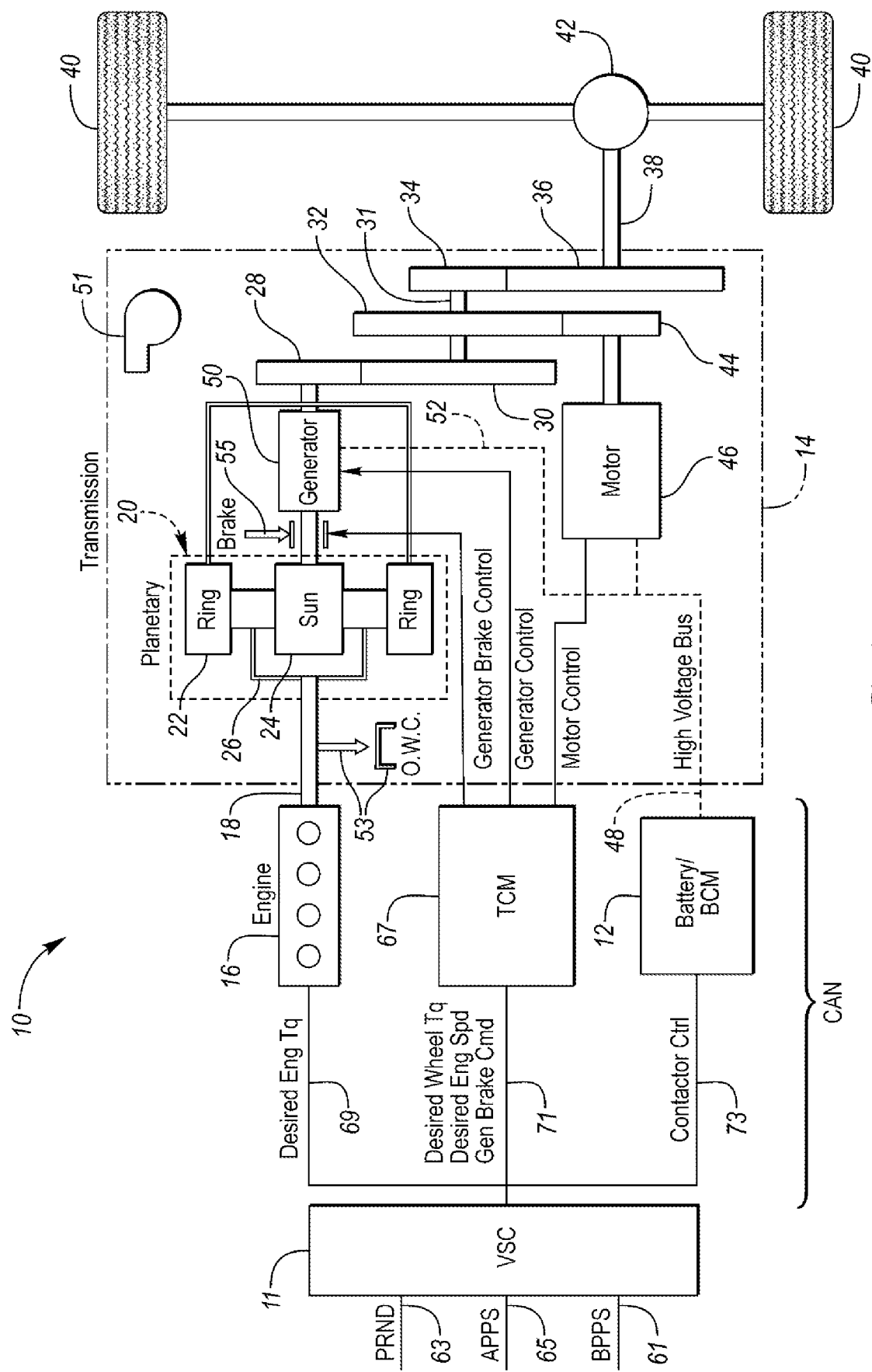
FIG. 1 is a schematic illustration of a representative powertrain of a hybrid electric vehicle.

Referring now to FIG. 1, a hybrid electric vehicle 10 having a powersplit powertrain is illustrated. The powertrain includes two power sources that are connected to the driveline: (1) an engine 16 and an electric machine 50 (which may be referred to as a generator) connected together via a planetary gear arrangement 20; and (2) an electric drive system including a battery 12 having a battery control module (BCM), an electric machine 46 (which may be referred to as a motor) and a generator 50. Battery 12 is an energy storage system for motor 46 and generator 50.

A vehicle system controller (VSC) 11 is configured to send control signals to and receive sensory feedback information from one or more of battery 12, engine 16, motor 46, and generator 50 in order for power to be provided to one or more vehicle drive or traction wheels 40 for propelling the vehicle 10. Controller 11 controls the power source proportioning between battery 12 and engine 16 for providing power to propel the vehicle 10 and thereby controls the state of charge (SOC) of battery 12. The battery 12 may more specifically be a traction battery.

Transmission 14 includes planetary arrangement 20, which includes a ring gear 22, a sun gear 24, and a carrier assembly 26. Ring gear 22 distributes torque to step ratio gears comprising meshing gear elements 28, 30, 32, 34, and 36. A torque output shaft 38 of transmission 14 is driveably connected to wheels 40 through a differential-and-axle mechanism 42. Gears 30, 32, and 34 are mounted on a counter shaft 31 with gear 32 engaging a motor-driven gear 44. Motor 46 drives gear 44. Gear 44 acts as a torque input for counter shaft 31. Engine 16 distributes torque through input shaft 18 to transmission 14. Battery 12 delivers electric power to motor 46 through power flow path 48. Generator 50 is connected electrically to battery 12 and to motor 46 through power flow path 52. The power flow paths 48 and 52 may include inverting circuitry to convert direct current power from the battery 12 into alternating current power, which may then be delivered to the motor 46 or generator 50 to increase the power output of the powertrain. The power flow paths 48 and 52 may also include rectifying circuitry to convert alternating current power from either the motor 46 or the generator 50 into direct current power, which may then be delivered to the battery 12 to recharge the battery 12, which may occur during regenerative braking or while the engine 16 is powering the generator 50.

The motor 46 or the generator 50 may be configured to deliver or receive rotational or mechanical power from the wheels 40 via the gears and shafts within the transmission 14. If receiving rotational or mechanical power from the wheels 40, the motor 46 or the generator 50 may then convert into electrical power that is stored as electrical energy in the battery 12. The motor 46 or the generator 50 may be considered as subcomponents of the transmission 14 or as separate components from the transmission 14. In either case, all or a portion of the gearing arrangement of the transmission (i.e., the gears and shafts) is disposed between motor 46 or the generator 50 and the wheels 40.

A transmission fluid pump 51 may be configured to circulate lubricating fluid within the transmission 14. More specifically, the pump 51 may be an electrically powered pump and may be configured to deliver the lubricating fluid to lubrication points within the transmission 14. Lubrication points may include engagements between shafts and bearings, meshing between gears, etc. In transmissions that include clutches, the pump 51 may also be configured to deliver the fluid to the clutches to engage and disengage the clutches.

While battery 12 is acting as a sole power source with engine 16 off, input shaft 18 and carrier assembly 26 are braked by an overrunning coupling (i.e., one-way clutch (OWC)) 53. A mechanical brake 55 anchors the rotor of generator 50 and sun gear 24 when engine 16 is on and the powertrain is in a parallel drive mode, sun gear 24 acting as a reaction element.

Controller 11 receives a signal PRND (park, reverse, neutral, drive) from a transmission range selector 63, which is distributed to transmission control module (TCM) 67, together with a desired wheel torque, a desired engine speed, and a generator brake command, as shown at 71. A battery switch 73 is closed after vehicle "key-on" startup. Controller 11 issues a desired engine torque request to engine 16, as shown at 69, which is dependent on accelerator pedal position sensor (APPS) output 65. A brake pedal position sensor (BPPS) distributes a wheel brake signal to controller 11, as shown at 61. A brake system control module (not shown) may issue to controller 11 a regenerative braking command based on information from the BPPS. TCM 67 issues a generator brake control signal to generator brake 55. TCM 67 also distributes a generator control signal to generator 50.

The controllers illustrated in FIG. 1 (i.e., VSC 11, BCM, and TCM 67) may be part of a larger control system and may be controlled by various other controllers throughout the vehicle 10. It should therefore be understood that the controllers and one or more other controllers can collectively be referred to as a "controller" that controls various actuators in response to signals from various sensors to control functions such as starting/stopping engine 16, operating the motor 46 to provide wheel torque, operating the generator to charge the battery 12, etc. The controllers may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controllers in controlling the vehicle 10.

It should be understood that the vehicle configuration described herein is merely exemplary and is not intended to be limited. Other hybrid or electric vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

It should be understood that the vehicle configuration described herein is merely exemplary and is not intended to be limited. Other electric or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), vehicles with electric machines connected to each wheel directly or a via step-up or step-down gearing arrangement, or any other hybrid or electric vehicle configuration known to a person of ordinary skill in the art.

Figure 2:
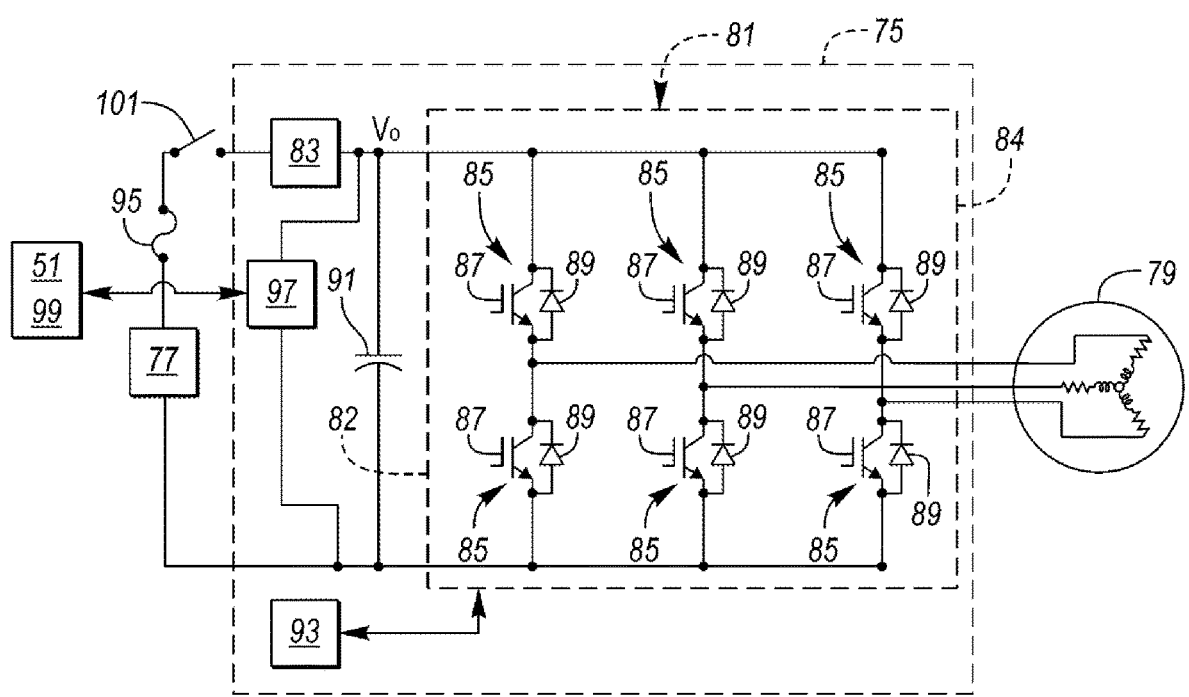
FIG. 2 is a circuit diagram of a power controller illustrating an inverter that is coupled to a DC power source and an electric machine.

Referring to FIG. 2, a circuit diagram of a power controller (or power supply device) 75 coupled to a power source 77 and an electric machine 79 is illustrated. The power source 77 may be the battery 12 and the electric machine 79 may be the motor 46 or generator 50 described in FIG. 1. However, the power controller 75 may be utilized in an electric drive system of any hybrid or electric vehicle configuration. The power source 77 may be coupled to the power controller 75 in order to drive the electric machine 79. The power controller 75 may include an inverter 81 and a voltage converter 83. The voltage converter 83 may be a DC to DC boost converter or a step-up DC to DC converter, which is configured to increase the voltage of power source 77 being input into the inverter 81. The voltage converter 83 includes an inductor. The inverter 81 and the voltage converter 83 may be configured to deliver electrical power to the electric machine 79.

The inverter 81 includes inverting circuitry. The inverting circuitry may include switching units 85. The switching units 85 may each comprise a transistor 87, such as an insulated gate bipolar transistor (IGBT), in antiparallel with a diode 89. The switching units 85 may be configured to provide alternating current to the electric machine 79. More specifically, the inverter 81 may be configured to convert direct electrical current provided by the power source 77 at an input side 82 of the inverter 81 into alternating electrical current, which is then delivered to the electric machine 79 at an output side 84 of the inverter 81. The inverter 81 may also be configured to convert alternating electrical current provided by the electric machine 79 at the output side 84 of the inverter 81 into direct electrical current, which is then delivered to the power source 77 at the input side 82 of the inverter 81.

The power controller 75 may include a linking capacitor 91. The linking capacitor 91 may be disposed between the power source 77 and the inverter 81 at the input side 82 of the inverter 81. The linking capacitor 91 may be configured to absorb ripple currents generated at the inverter 81 or the power source 77, and stabilize the DC-link voltage, Vo, for inverter 81 control. Stated in other terms, the linking capacitor 91 may be arranged to limit voltage variation at an input of inverting circuitry due to ripple currents generated by the inverting circuitry or the power source 77. The power controller 75 may include a drive board 93 for controlling the inverting circuitry. The drive board 93 may be a gate drive board that is configured to operate the transistors 87 of the switching units 85 of the inverter 81 when converting the direct current of the power source 77 into alternating current and delivering the alternating current to the electric machine 79.

The voltage converter 83 may include an inductor. The circuitry of the voltage converter (not shown), including the inductor, may be configured to amplify or increase the voltage of the electrical power being delivered to the electric machine 79 from the power source 77. A fuse 95 may be disposed on the direct current side of the inverter 81 to protect the inverting circuitry from surges in electrical power.

The disclosure should not be construed as limited to the circuit diagram of FIG. 2, but should include power control devices that include other types inverters, capacitors, converters, or combinations thereof. For example, the inverter 81 may be an inverter that includes any number of switching units, the power controller 75 may include rectifying circuitry that converts the alternating current of the electric machine 79 into direct current to recharge the power source 77 (e.g., the generator 50 recharging the battery 12 during regenerative braking), and/or the linking capacitor 91 may be configured to couple one or a plurality of inverters to a power source.

A voltage controller 97 is configured to deliver DC electrical power from the inverter 81 to the pump 51 and other vehicle accessories 99. The pump 51 and the vehicle accessories 99 may more specifically require a low-voltage power source (e.g., a 12-Volt power source). The voltage controller 97 converts the higher-voltage DC power at the input side 82 of the inverter 81 to the required lower-voltage power needed to power the pump 51 and other vehicle accessories 99. The voltage controller 97 may be a DC to DC buck converter or a step-down DC to DC converter that decreases the voltage from the input side 82 of the inverter 81 and delivers the decreased-voltage power to the pump 51 and the vehicle accessories 99. The voltage controller 97 may be passive type voltage converter or a switching type voltage converter. The vehicle accessories 99 may include, but are not limited to, climate control systems, power steering systems, radios, control interfaces, various controllers, entertainment systems (e.g., monitors, DVD players, etc.), electric heaters, or any other system or device that is electrically operated via the low-voltage power source.

A switch 101 may be disposed between the power source 77 and the inverter 81. The switch 101 may be referred to as battery contactor. The switch 101 being in the opened position may correspond to the vehicle being in a shutdown condition. Another indicator that the vehicle 10 is shutdown may be a "key-off" position of an ignition.

Figure 3:
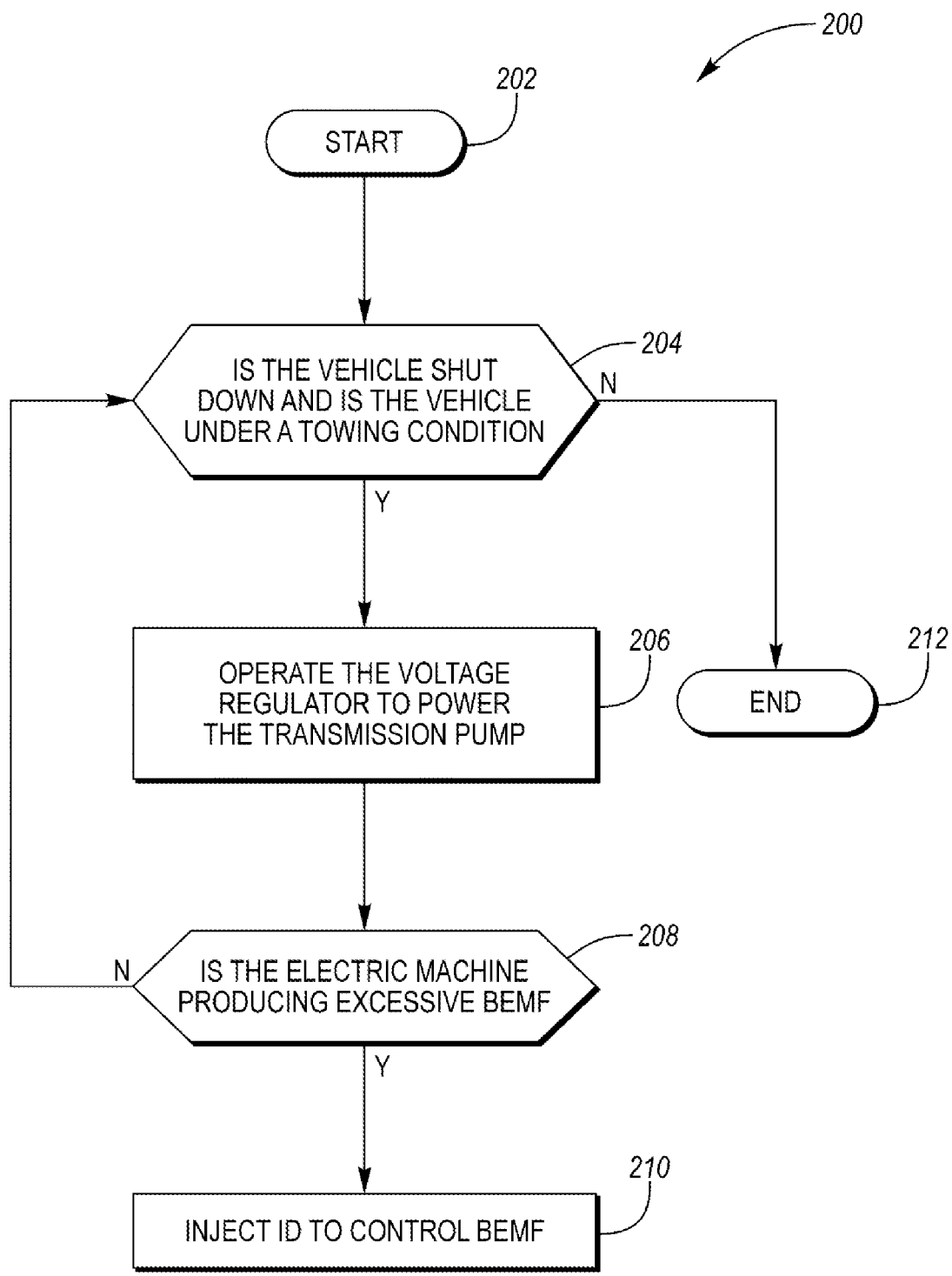
FIG. 3 is a flowchart of a method for powering and controlling a transmission pump during towing condition of the vehicle.

Referring to FIG. 3, a flowchart of a method 200 for controlling the transmission pump 51 during towing condition of the vehicle 10 is illustrated. The method 200 may be stored as control logic and/or an algorithm within one or more of the vehicle controllers (e.g., VSC 11, TCM 67, BCM, etc.). The method 200 is initiated at start block 202. Next, the method 200 moves on to block 204.

At block 204, it is determined if the vehicle 10 is shutdown and if the if the vehicle 10 is under a towing condition. The vehicle 10 being shutdown may correspond to the switch 101 being in the opened position, a "key-off" position of an ignition, or any other indicator that the vehicle 10 has not be turned on for normal driving operation. The vehicle 10 being under a towing condition while the vehicle 10 is shutdown may be derived from several factors. For example, (i) a back electromotive force in the electric machine 79 caused by a drive wheel (e.g., wheel 40) powering the electric machine 79 (e.g., causing rotation of the rotor of the electric machine 79) such that the electric machine 79 generates AC electrical power which is delivered to the output side 84 of the inverter 81; (ii) a voltage of the linking capacitor 91 exceeding a threshold, which is caused by the AC electrical power generated via the electromotive force electric machine 79 and being delivered to the inverter 81 (the electrical power is able to flow from the output side 84 of the inverter 81 to the linking capacitor via the diodes 89 of switching units 85); (iii) a speed (e.g., a rotational speed) of the drive wheel exceeding a threshold; (iv) a speed of the electric machine (e.g., a rotational speed of the electric machine rotor) exceeding a threshold; or (v) a speed of vehicle 10, may each be an indicator that the vehicle 10 is under a towing condition if the vehicle 10 is also shutdown.

If it is determined that the vehicle 10 is shutdown and is under a towing condition, the method 200 moves on to block 206, where the voltage controller 97 is operated to deliver DC electrical power from the inverter 81 to the pump 51 and/or the vehicle accessories 99. The voltage controller 97 may be configured to automatically deliver the DC electrical power from the inverter 81 to the pump 51 and/or the vehicle accessories 99 once it is determined that the vehicle 10 is shutdown and is under a towing condition. Under such an automatic operation, the voltage controller 97 may "wake up" and begin delivering the DC electrical power from the inverter 81 to the pump 51 and/or the vehicle accessories 99 once a sufficient input voltage to the voltage controller 97 is detected. The input voltage may correspond to the voltage of the linking capacitor 91 or may be based on the back electromotive force coefficient of the electric machine 79 that corresponds to a particular motor speed. Other controllers (e.g., VSC 11, TCM 67, BCM, etc.) or devices may also "wake up" to deliver power and/or control the pump 51 and/or the vehicle accessories 99 according to a desired algorithm or control logic.

The operation of the voltage controller 97 may not be automatic and may be controlled via a controller (e.g., VSC 11, TCM 67, BCM, etc.) in order to deliver the DC electrical power from the inverter 81 to the pump 51 and/or the vehicle accessories 99 once it is determined that the vehicle 10 is shutdown and is under a towing condition. The controller may also operate the pump 51 according to a desired algorithm or control logic. For example, the controller may only operate the pump 51 (i) according to a specified duty cycle or (ii) only when the wheel speed is above a specified threshold where lubrication in the transmission gearing is necessary (e.g., above a wheel speed that equates to the shafts, gears, etc. in the transmission rotating above a speed where wear and tear is accelerated beyond what is tolerable if not lubricated).

Furthermore, if the vehicle includes multiple separate drivetrains, each including a transmission or geartrain, for different wheels where each separate drivetrain has (i) an electric machine that delivers power to wheels of that particular drivetrain, (ii) each electric machine draws power from an inverter of that particular drivetrain, and (iii) each transmission or geartrain of that particular drivetrain includes an electric pump that can draw power from a voltage controller that is connected to an input side of the inverter of that particular drivetrain, the method 200 may distinguish between wheels that are in a towing mode and wheels that are not in a towing mode in order to operate the electric pumps. For example, (i) if the vehicle includes first and second drivetrains having first and second axles and (ii) if the wheels on the first and second axles are on the ground and spinning during a towing condition while the vehicle is shutdown according to method 200, first and second voltage controllers drawing power from inverters connected to first and second electric machines generating back electromotive force in the first and second drivetrains, respectively, may be utilized to power first and second electric pumps in the transmissions or geartrains of the first and second drivetrains to lubricate the moving parts in the transmissions or geartrains of the first and second drivetrains, respectively. On the other hand, if the vehicle is raised or hoisted onto a towing vehicle such that the wheels of the first axle are on the ground and spinning but the wheels of the second axle are not on the ground and spinning during a towing condition, only the first electric pump may be operated while the second electric pump remains shutdown. Under such a condition, the components in the second drivetrain (e.g., gears, shafts, etc.) will not be spinning and therefore will not need to be lubricated.

Next, the method 200 moves on to block 208 where it is determined if the electric machine 79 is producing an excessive back electromotive force. If the electric machine 79 is not producing an excessive back electromotive force, the method 200 may simply continue operating the pump 51 and/or the vehicle accessories 99 according to block 206 and may return to block 208 after a specified period of time, or the method 200 may recycle back to block 204. If the electric machine 79 is producing an excessive back electromotive force, the method 200 moves on to block 210, where direct axis current, Id, is injected into the coils of the electric machine 79 to control or reduce the back electromotive force to a desired level. The direct axis current, Id, may be directed to the coils of the electric machine 79 via the power source 77.

Returning to block 204. If it is determined that the vehicle 10 is not both shutdown and under a towing condition, the method 200 moves on to block 212, where the method 200 ends. The step at block 212 may coincide with the voltage controller 97, the pump 51, accessories 99, and any other electrical device (e.g., VSC 11, TCM 67, BCM, etc.) remaining shutdown or being shutdown.

It should be understood that the flowchart in FIG. 3 is for illustrative purposes only and that the method 200 should not be construed as limited to the flowchart in FIG. 3. Some of the steps of the method 200 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a drive wheel;
   an electric machine configured to deliver and receive mechanical power to and from the drive wheel;
   a battery;
   an inverter having an input connected to the battery and an output connected to the electric machine, and configured to convert power between DC electrical power at the input and AC electrical power at the output;
   a gearing arrangement of a transmission disposed between the electric machine and the drive wheel;
   a pump configured to circulate lubricating fluid within the transmission;
   a voltage controller configured to deliver DC electrical power from the inverter to the pump; and
   a vehicle controller programmed to, in response to the drive wheel powering the electric machine to generate AC electrical power and the electric machine delivering AC electrical power to the inverter during a towing condition of the vehicle, operate the voltage controller to power the pump.

2. The vehicle of claim 1, wherein the vehicle controller is further programmed to, in response to a non-towing condition and a shutdown condition of the vehicle, shutdown the pump.

3. The vehicle of claim 1, wherein the voltage controller is a step-down DC to DC converter.

4. The vehicle of claim 1 further comprising a linking capacitor disposed at the input of the inverter, and wherein the towing condition of the vehicle corresponds to a voltage of the linking capacitor exceeding a threshold while the vehicle is shutdown.

5. The vehicle of claim 4 further comprising a switch disposed between the battery and the inverter, and wherein the vehicle being shutdown corresponds to the switch being open.

6. The vehicle of claim 1, wherein the towing condition of the vehicle corresponds to a speed of the drive wheel exceeding a threshold while the vehicle is shutdown.

7. The vehicle of claim 6 further comprising a switch disposed between the battery and the inverter, and wherein the vehicle being shutdown corresponds to the switch being open.

8. The vehicle of claim 1, wherein the towing condition of the vehicle corresponds to a speed of the electric machine exceeding a threshold while the vehicle is shutdown.

9. The vehicle of claim 8 further comprising a switch disposed between the battery and the inverter, and wherein the vehicle being shutdown corresponds to the switch being open.

10. A vehicle comprising:
at least one drive wheel;
an electric machine configured to deliver power to the at least one drive wheel to propel the vehicle;
a traction battery configured to store electrical energy;
an inverter having an input and an output, and configured to (i) receive DC electrical power from the traction battery at the input, (ii) convert the DC electrical power into AC electrical power, and (iii) deliver the AC electrical power to the electric machine at the output;
a gearing arrangement of a transmission disposed between the electric machine and the at least one drive wheel;
an electrically powered pump configured to deliver fluid to lubrication points within the transmission; and
a step-down voltage controller configured to deliver the DC electrical power from the input of the inverter to the electrically powered pump in response to (i) the at least one drive wheel powering the electric machine during a towing condition of the vehicle and (ii) the electric machine generating and delivering AC electrical power to the inverter.

11. The vehicle of claim 10 further comprising a linking capacitor disposed at the input of the inverter, and wherein the towing condition of the vehicle corresponds to a voltage of the linking capacitor exceeding a threshold while the vehicle is shutdown.

12. The vehicle of claim 11 further comprising a switch disposed between the traction battery and the inverter, and wherein the vehicle being shutdown corresponds to the switch being open.

13. The vehicle of claim 10, wherein the towing condition of the vehicle corresponds to a speed of the at least one drive wheel exceeding a threshold while the vehicle is shutdown.

14. The vehicle of claim 10, wherein the towing condition of the vehicle corresponds to a speed of the electric machine exceeding a threshold while the vehicle is shutdown.

15. A vehicle comprising:
an inverter having an input connected to a battery and an output connected to an electric machine, and configured to convert power between DC electrical power at the input and AC electrical power at the output;
a pump configured to circulate lubricating fluid within a transmission;
a buck converter configured to deliver DC electrical power from the inverter to the pump; and
a controller programmed to, in response to the electric machine delivering AC electrical power to the inverter during a towing condition of the vehicle and while the vehicle is shutdown, operate the buck converter to power the pump.

16. The vehicle of claim 15, wherein the controller is further programmed to, in response to a non-towing condition and a shutdown condition of the vehicle, shutdown the pump.

17. The vehicle of claim 15 further comprising a linking capacitor disposed at the input of the inverter, and wherein a towing condition of the vehicle corresponds to a voltage of the linking capacitor exceeding a threshold.

18. The vehicle of claim 17 further comprising a switch disposed between the battery and the inverter, and wherein the vehicle being shutdown corresponds to the switch being open.

19. The vehicle of claim 15 further comprising a drive wheel connected to the electric machine, wherein the towing condition of the vehicle corresponds to a speed of the drive wheel exceeding a threshold.

20. The vehicle of claim 15, wherein the towing condition of the vehicle corresponds to a speed of the electric machine exceeding a threshold.

* * * * *